A. C. RICHARDS.
Restoring Waste Rubber.
No. 29,717.
Patented Aug. 21, 1860.
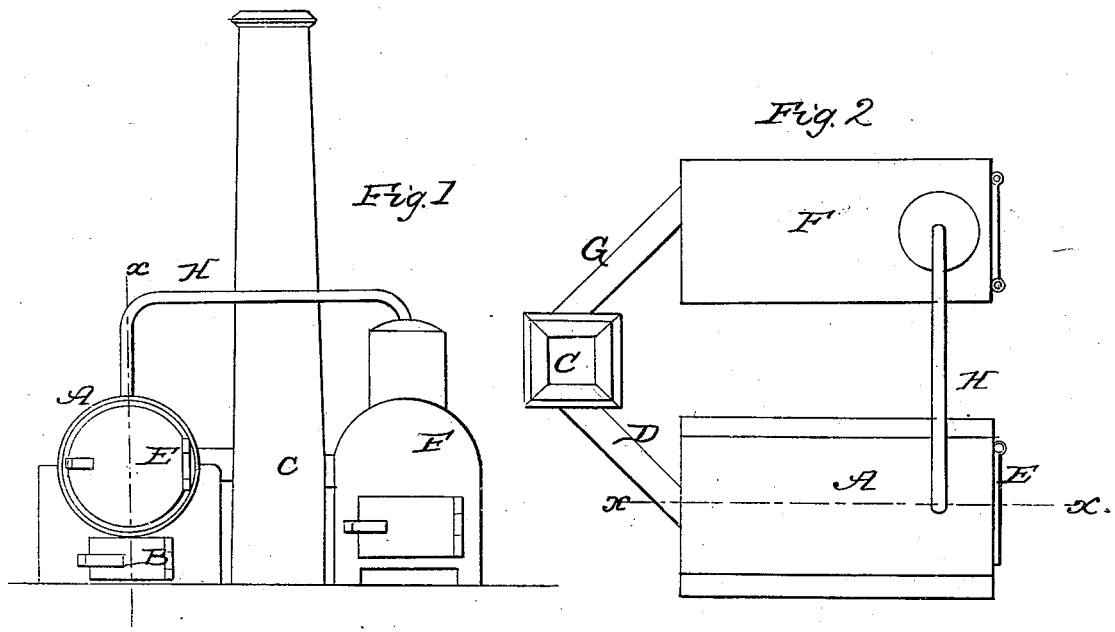
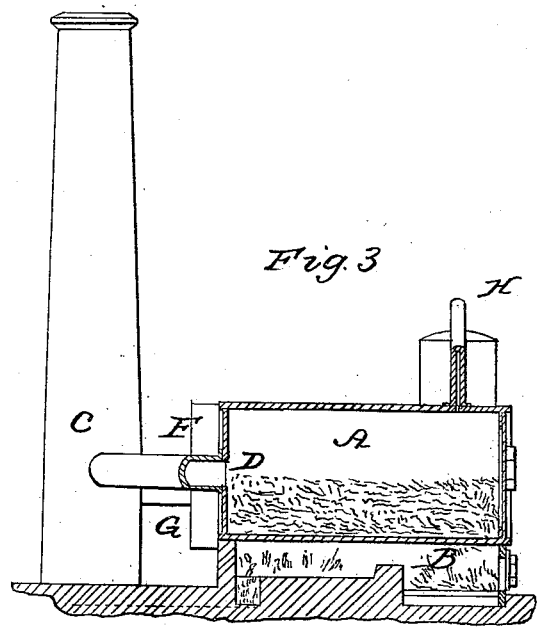
Witnesses
M. and Livingston
B. Giving
Inventor
Albert C. Richards

UNITED STATES PATENT OFFICE.

ALBERT C. RICHARD, OF NEW YORK, N. Y.

IMPROVEMENT IN DEVULCANIZING WASTE RUBBER.

Specification forming part of Letters Patent No. 29,717, dated August 21, 1860.

*To all whom it may concern:*

Be it known that I, ALBERT C. RICHARD, of the city, county, and State of New York, have invented a new and Improved Process of Restoring Waste Vulcanized India-Rubber; and I do hereby declare that the following is a full, clear, and exact description of the same, reference being had to the accompanying drawings, forming part of this specification, in which—

Figure 1 is a front view of the apparatus employed in the process. Fig. 2 is a plan of the same. Fig. 3 is a vertical section of the same in the plane indicated by the line $x\,x$ in Figs. 1 and 2.

Similar letters of reference indicate corresponding parts in the several figures.

To enable others skilled in the art to use my improved process, I will proceed to describe an apparatus in which it is performed and the manner in which it is conducted.

A is the devulcanizing-chamber, of horizontal, cylindrical, or other form, having a fire-place, B, below it, in which a fire is made to heat the said vessel to the desired degree.

C is a chimney, with which the fire-place B communicates by means of a chimney which is not shown, and D is an outlet pipe or flue leading from the interior of the vessel A to the chimney C. The said vessel A is furnished with a large door, E, in front for the introduction of the rubber, and should be furnished internally with shelves, upon which the rubber may be laid to prevent its coming in contact with the sides of the vessel and being burned.

F is a boiler arranged convenient to the devulcanizing-vessel A, with its flue G leading to the chimney C, and with a steam-pipe, H, leading to the devulcanizing-vessel.

The waste rubber, before being subjected to the devulcanizing process, is ground to powder between rollers, and fire having been made in the fire-place B to heat the vessel A, and under the boiler to generate steam, the vessel A is charged and closed up and steam admitted freely thereinto in a properly-regulated stream by opening a cock in the pipe H, while its interior is kept heated by the fire to a temperature of over 600°. The steam circulates freely through the vessel A and escapes by the outlet D to the chimney, along with the sulphurous vapors which are extracted from the rubber by the heat. By the employment of the above process the waste rubber is devulcanized in about from one to three hours, which is a much shorter time than is required by any of the processes heretofore employed, while the devulcanization of the whole charge is effected more thoroughly.

Having thus described my invention, what I claim as new, and desire to secure by Letters Patent, is—

The within-described process by which waste vulcanized rubber is devulcanized, all as set forth.

ALBERT C. RICHARD.

Witnesses:
M. M. LIVINGSTON,
B. GIROUX.